(12) United States Patent
Gruner et al.

(10) Patent No.: US 7,785,557 B2
(45) Date of Patent: Aug. 31, 2010

(54) METHOD OF PRODUCING A GRAPHENE FILM AS TRANSPARENT AND ELECTRICALLY CONDUCTING MATERIAL

(75) Inventors: George Gruner, Los Angeles, CA (US); David Hecht, San Carlos, CA (US); Liangbing Hu, Mountain View, CA (US)

(73) Assignee: Unidym, Inc., Sunnyvale, CA (US)

( * ) Notice: Subject to any disclaimer, the term of this patent is extended or adjusted under 35 U.S.C. 154(b) by 0 days.

(21) Appl. No.: 12/237,361

(22) Filed: Sep. 24, 2008

(65) Prior Publication Data

US 2009/0017211 A1 Jan. 15, 2009

Related U.S. Application Data

(63) Continuation of application No. 11/563,623, filed on Nov. 27, 2006, now Pat. No. 7,449,133.

(60) Provisional application No. 60/812,977, filed on Jun. 13, 2006.

(51) Int. Cl.
*H01B 19/04* (2006.01)

(52) U.S. Cl. .............. 423/445 R; 423/447.1; 423/460; 427/58; 427/162; 427/180; 252/500; 252/511; 252/378 R; 977/734; 977/737; 977/742; 977/753; 977/832; 977/834

(58) Field of Classification Search ........ 252/500, 252/511, 378 R; 427/256, 58, 162, 180; 423/447.1, 445 R, 460; 977/734, 737, 742, 977/753, 832, 834

See application file for complete search history.

(56) References Cited

U.S. PATENT DOCUMENTS

| | | | |
|---|---|---|---|
| 2004/0028859 A1* | 2/2004 | LeGrande et al. | 428/36.91 |
| 2004/0265550 A1* | 12/2004 | Glatkowski et al. | 428/209 |
| 2005/0127334 A1* | 6/2005 | Shibata et al. | 252/502 |
| 2005/0230560 A1 | 10/2005 | Glatkowski et al. | |
| 2006/0057290 A1 | 3/2006 | Glatkowski et al. | |
| 2007/0131915 A1 | 6/2007 | Stankovich et al. | |
| 2007/0284557 A1 | 12/2007 | Gruner et al. | |

OTHER PUBLICATIONS

Bunch et al. "Coulomb Oscillation and Hall Effect in Quasi-2D Graphite Quantum Dots." NanoLetters, vol. 5, pp. 287-290, published on the Web on Jan. 8, 2005.*
Lu et al., Nanotechnology 10 (1999) 269-272.
Niyogi et al., J. Am. Chem. Soc. 2006, 128, 7720-7721.
Zhang et al., Phys. Rev. Lett. 96, 136806 (2006).
Ragan-Kelley et al., DEAS REU 2005.
Zhang et al., Appl. Phys. Lett. 86, 073104 (2005).
Novoselov et al., 102 PNAS 10451-53 (2005).
Stankovich et al., Nature, vol. 442, Jul. 20, 2006.

* cited by examiner

*Primary Examiner*—Mark Kopec
*Assistant Examiner*—Tri V Nguyen

(57) ABSTRACT

A transparent and conductive film comprising at least one network of graphene flakes is described herein. This film may further comprise an interpenetrating network of other nanostructures, a polymer and/or a functionalization agent(s). A method of fabricating the above device is also described, and may comprise depositing graphene flakes in solution and evaporating solvent therefrom.

15 Claims, 5 Drawing Sheets

US 7,785,557 B2

METHOD OF PRODUCING A GRAPHENE FILM AS TRANSPARENT AND ELECTRICALLY CONDUCTING MATERIAL

CROSS-REFERENCE TO RELATED APPLICATION

This application is a continuation of prior U.S. application Ser. No. 11/563,623, filed on Nov. 27, 2006 now U.S. Pat. No. 7,499,133 and entitled "GRAPHENE FILM AS TRANSPARENT AND ELECTRICALLY CONDUCTING MATERIAL," which claims priority to U.S. Provisional Application No. 60/812,977, filed Jun. 13, 2006 and entitled "GRAPHENE FILM AS TRANSPARENT AND ELECTRICALLY CONDUCTING MATERIAL." Each of the foregoing applications is commonly assigned to the assignee of the present invention and is hereby incorporated herein by reference in its entirety.

FIELD OF THE INVENTION

The present invention relates generally to transparent and conducting films, and more specifically to transparent and conducting films comprising at least one network of graphene.

BACKGROUND OF THE INVENTION

Many modern and/or emerging applications require at least one device electrode that has not only high electrical conductivity, but high optical transparency as well. Such applications include, but are not limited to, touch screens (e.g., analog, resistive, improved analog, X/Y matrix, capacitive), flexible displays (e.g., electro-phoretics, electro-luminescence, electrochromatic), rigid displays (e.g., liquid crystal (LCD), plasma (PDP), organic light emitting diode (LED)), solar cells (e.g., silicon (amorphous, protocrystalline, nanocrystalline), cadmium telluride (CdTe), copper indium gallium selenide (CIGS), copper indium selenide (CIS), gallium arsenide (GaAs), light absorbing dyes, quantum dots, organic semiconductors (e.g., polymers, small-molecule compounds)), fiber-optic communications (e.g., electro-optic and opto-electric modulators) and microfluidics (e.g. electrowetting on dielectric (EWOD)). As used herein, a layer of material or a sequence of several layers of different materials is said to be "transparent" when the layer or layers permit at least 50% of the ambient electromagnetic radiation in relevant wavelengths to be transmitted through the layer or layers. Similarly, layers which permit some but less than 50% transmission of ambient electromagnetic radiation in relevant wavelengths are said to be "semi-transparent."

Currently, the most common transparent electrodes are transparent conducting oxides (TCOs), specifically indium-tin-oxide (ITO) on glass. However, ITO can be an inadequate solution for many of the above-mentioned applications (e.g., due to its relatively brittle nature and correspondingly inferior flexibility and abrasion resistance), and the indium component of ITO is rapidly becoming a scarce commodity. Additionally, ITO deposition usually requires expensive, high-temperature sputtering, which can be incompatible with many device process flows. Hence, more robust and abundant transparent conductor materials are being explored.

Single-walled carbon nanotubes (SWNTs) have attracted a great deal of interest, due to their unique mechanical and electrical properties. Highly conductive SWNT networks having a dc conductivity of at least about 4000 Siemens/cm and methods of fabricating these together with the ink material that is used for the fabrication have been described in the literature. However, although nanotube networks fabricated to date are both conducting and transparent, they have not been able to achieve the right combination of sheet conductance and transparency to be competitive with currently used materials such as indium-tin-oxide (ITO). (L. Hu et al *Nano Letters* 4, 2513 (2004)) N. P. Armitage, J-C P Gabriel and G. Gruner, "Langmuir-Blodgett Nanotube Films", *J. Appl. Phys. Lett*, 95, 6, 3228-3330 (2003)).

SUMMARY

The present invention relates to an interconnected network, or film comprised of finite sized graphene sheets, called "flakes", as a transparent and electrically conducting material. One embodiment of the invention is a transparent and electrically conducting network comprised of multiple flakes of graphene. Another embodiment of the invention is a transparent and electrically conductive network comprised of multiple flakes of graphene in combination with other nanostructured materials, such as carbon nanotubes. In another embodiment of the invention, a transparent and electrically conductive network is comprised of functionalized graphene flakes. A further embodiment of the invention is films comprised of at least one layer of graphene flakes and at least one layer of another material. In another embodiment, a transparent and electrically conductive network is made of graphene-polymer composites. In a sixth embodiment, new and improved techniques are used to deposite graphene films in different ways onto different substrates. A final embodiment of the invention is new and improved devices based on integration of graphene films.

Graphene in this invention is defined as single or multiple layers of graphene. Novoselov, K. S. et. al. PNAS, Vol. 102, No. 30, 2005, Novoselov, K. S. et. al. Science, Vol 306, 2004. Graphene films comprise at least one network of graphene "flakes". Graphene "flakes" are finite-area graphene constructions.

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed.

BRIEF DESCRIPTION OF THE DRAWINGS

The invention is better understood from reading the following detailed description of the preferred embodiments, with reference to the accompanying figures in which.

Features, elements, and aspects of the invention that are referenced by the same numerals in different figures represent the same, equivalent, or similar features, elements, or aspects in accordance with one or more embodiments of the system.

DETAILED DESCRIPTION OF THE EMBODIMENTS

Figure 1:
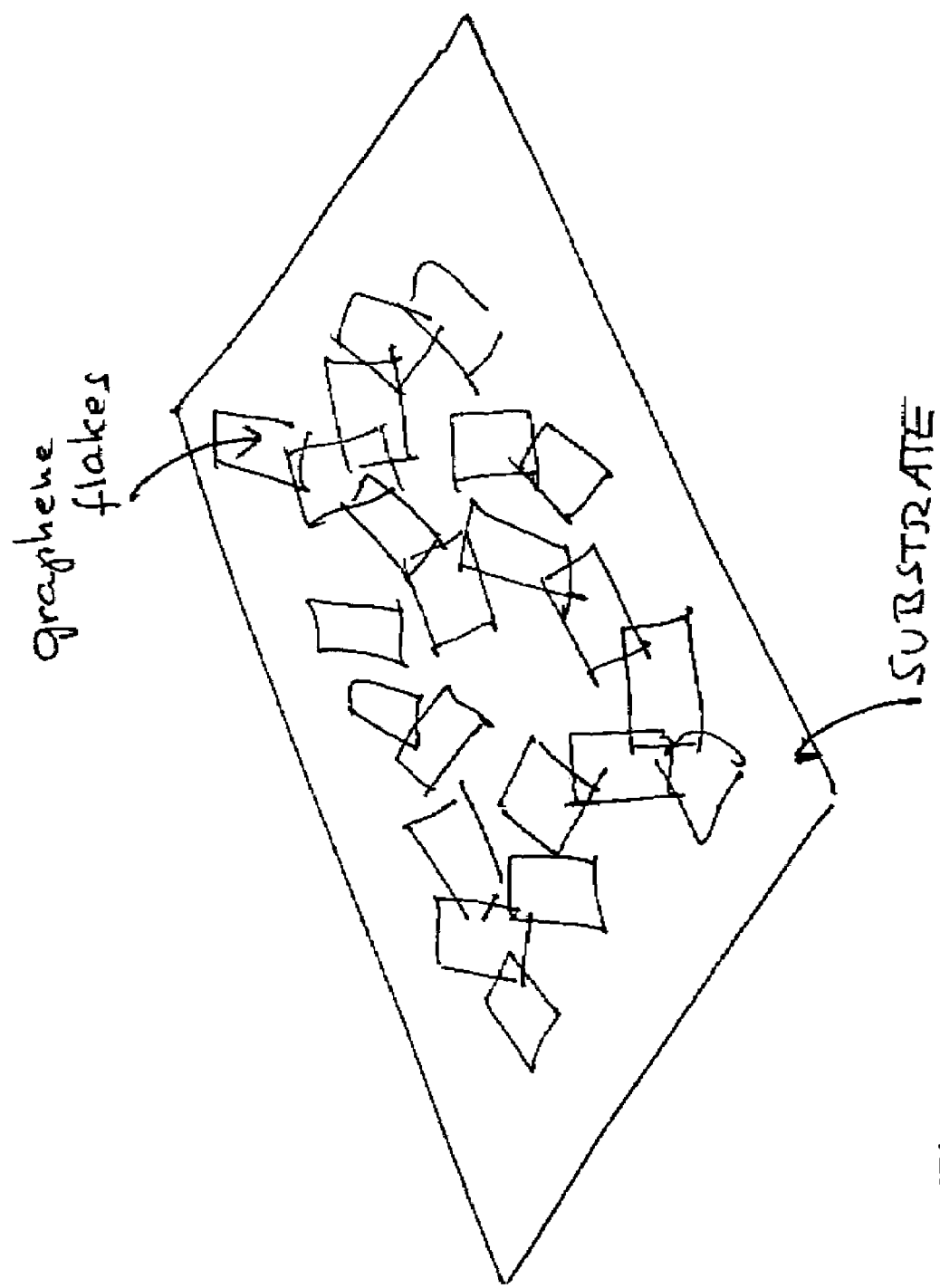
FIG. 1. is an illustration of graphene flakes on a substrate.
Figure 2:
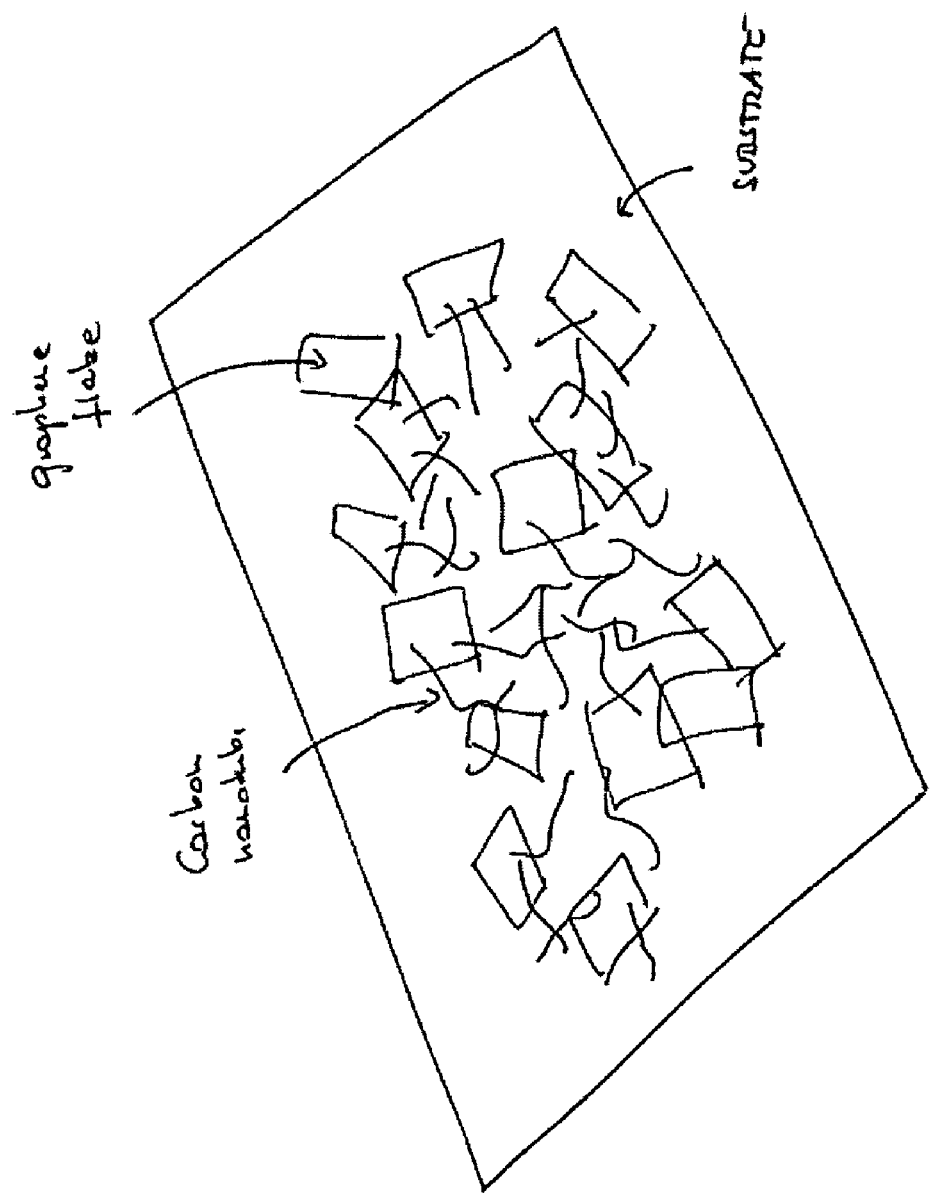
FIG. 2. is an illustration of a graphene flake—carbon nanotube network.
Figure 3:
FIG. 3. is an SEM image of a graphene flake on a substrate.
Figure 4:
FIG. 4. is an SEM image of a Graphene flake/CNT network.

The invention comprises transparent and conductive materials comprising graphene flakes and devices incorporating such materials.

Graphene is a single-atomic-layer of graphite and as such is expected to be a zero-gap semiconductor. Although it is only one atom thick and unprotected from the immediate environment, graphene exhibits high crystal quality and ballistic transport at submicron distances. Moreover, graphene can be light, highly flexible and mechanically strong (resisting tearing by AFM tips), and the material's dense atomic structure should make it impermeable to gases.

A SWNT can be conceptualized by wrapping a graphene layer into a seamless cylinder. It is recognized that the SWNT's electronic properties stem from the properties of the graphene layer and that layer's unusual band structure (only two bands crossing at the Fermi level). Thus, it is anticipated that most of the electronic properties of SWNTs are shared by other low-dimensional graphitic structures.

First Embodiment

Films Comprising Graphene Flakes

A first embodiment of the invention is a film formed by an interconnected network of graphene flakes so that there is at least one conduction path across the film.

Figure one illustrates graphene flakes on a substrate, and figure three provides an SEM image of a graphene flake on a substrate.

First, commercially available graphene flakes are obtained. The graphene flakes can be treated depending on the desired transparency and conductivity of the resulting films. Examples of preparation steps that can be used to tailor the properties of the resulting films include, but are not limited to, thinning the graphene flakes or doping the graphene flakes. After the graphene flakes have been properly prepared, they are dissolved in solvents such as organic solvents such as dichlorobenzene, chloroform, or dimethylformamide. The solvent can include aqueous dispersions with a suitable surfactant as a solubilization agent. The solvent can also include other solubilization agents such as DNA or polymers. In a preferred embodiment, the solution is then sonicated for a period of time.

After being solubilized, the solution is purified to remove impurities and flakes that have undesirable sizes. An example of a suitable purification method is centrifugation, which results in separation of the liquid containing soluble compounds and concentrated material at the bottom of the centrifuge.

The supernatant is then dispensed through a filter to form films comprised of networks of graphene flakes. An example of a suitable filter is a porous alumina filter. A media such as water is then used to wash away any remaining solvent or surfactant. The resulting films have both conductivity and transparency in the visible spectrum. For example, films achieved by practicing the invention were 50 kOhms/sq and 50% transparent.

EXAMPLE

Graphene films were fabricated by dispersing the graphene flakes (Asbury Carbon grade 3061) in an appropriate solvent, including dichlorobenzene or surfactant aided dispersions in water. This may include Sodium dodecyl sulfate in water. The graphene flakes, once dispersed in the solvent, are sonicated by a probe sonicator, resulting in a black solution. This solution is centrifuged to remove larger flakes and impurities. The supernatant is dispensed through a porous alumina filter, and water is subsequently washed over it to remove any remaining solvent/surfactant. The graphene films on the filter were transfer printed to a plastic substrate such as PET by the use of a PDMS stamp. The stamp is pressed against the film on the filter, and the film is transferred to the stamp. The stamp can then be pressed against a plastic substrate, and gently heated, to complete the transfer process. The graphene flake films were 50 kOhms/sq and 50% transparent.

Second Embodiment

Interconnected Networks of Graphene Sheets and Carbon Nanotubes

In another embodiment of the invention, graphene flakes are deposited in combination with other nanostructured materials, in particular carbon nanotubes, so that an interconnected graphene and nanotube layer provides electrical conduction. Figure two is an illustration of a graphene flake-carbon nanotube network, and figure four is an SEM image of a graphene flake-carbon nanotube network.

EXAMPLE

Figure 5:
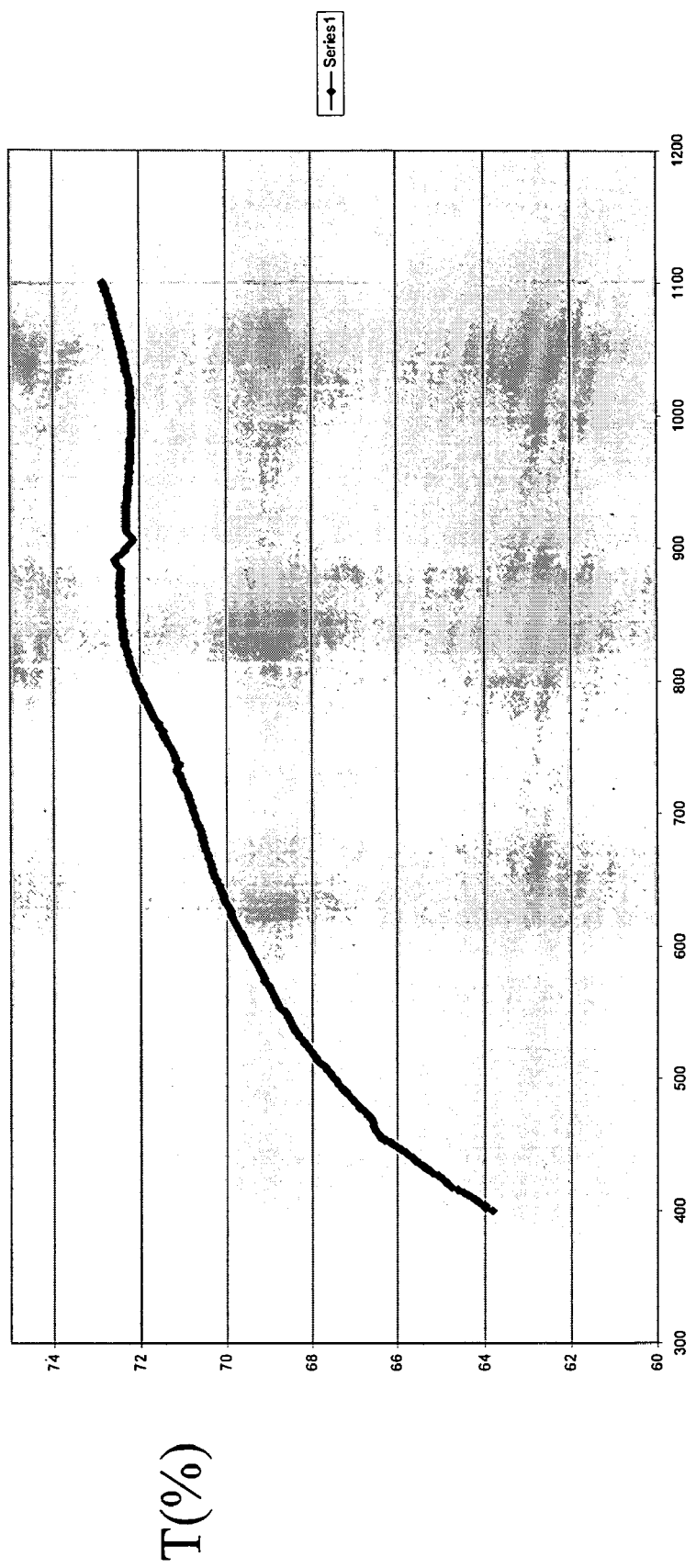
FIG. 5. is a graph of the optical transparency of a graphene network with a 1 Mohm sheet resistance.

A graphene flake-carbon nanotube composite was fabricated by repeating the method for the fabrication of the graphene films, with the addition of carbon nanotubes to the solvent. An interpenetrating network of graphene flakes and carbon nanotubes also leads to a network that is 80% transparent and 2 kOhms/sq or 65% and 1 kOhm/sq, where the optical transmission spectra for a 1 kOhm/sq sample is shown in FIG. 5.

Third Embodiment

Graphene Films that are Functionalized

In another embodiment of the invention, graphene films are comprised of functionalized graphene flakes, or functionalized nanotubes in combination with graphene flakes, or functionalized nanotubes in combination with functionalized graphene flakes. Functionalization involves attaching chemicals to nanostructured materials to change the properties of the nanostructured materials such as the electron or hole concentration or the mobility. As an example, the conductivity can be enhanced by attaching molecules to nanotubes or graphene flakes. The effect of such attachment is twofold. First, the carrier number (i.e. the electron or hole concentration) is changed. Second, the mobility is changed through the potential the attached molecule creates. Generally, relatively strong binding to graphene is required in order to create a stable structure, where the molecules are not removed by a liquid, mechanical effects and the like. Such strong binding however also leads to a strong potential that decreases the mobility.

Examples of molecules that can be used to functionalize the graphene flakes to tune the properties of films according to the present invention, include but are not limited to:

| Type | Examples |
| --- | --- |
| Organic Compounds | Tetracyanoquinodimathane TCNQ |
|  | Tetracyanoethylene TCNE |
| Polymers With Electron Acceptor Groups | Polyethylene Imine |
| Inorganic Species | Bromine (Br) |
|  | Chlorine (Cl) |
|  | Iodine (I) |
|  | Thionyl Chloride ($SOCl_2$) |
|  | Sulphur Trioxide ($SO_3$) |
|  | Nitrogen Dioxide ($NO_2$) |
|  | Nitrosonium Tetrafluoroborate ($NOBF_4$) |
|  | Nitronium Tetrafluoroborate ($NO_2BF_4$) |
| Light Sensitive Materials | Porphyrines |

Fourth Embodiment

Other Layers in Combination With Graphene Layers

In another embodiment of the invention, films are constructed that are comprised of at least one layer of graphene flakes and at least one layer of another material. Examples of other layers that might be used include, but are not limited to: a polymer layer such as parylene, a poly-3,4-Ethylmethyl-dioxythophene, PEDOT; a light sensitive layer comprised of materials such as poly((m-phenylenevinyle)-co-)2.3.diotyloxy-p-phenylene)), PmPV; a polymer layer with electron donating or withdrawing properties such as polyethylene-imine (PEI); a layer comprised of materials with appropriate conducting and transparent properties and electron affinity of ionization potential; a layer of biomolecules such as bovine serum albumin (BSA). The intercalation of the different layers of the films can be adjusted to optimize the desired properties of the films.

Multi-layered films can be fabricated by, for example, depositing a film containing graphene flakes, then depositing a layer of different material, and then depositing an additional layer of film containing graphene flakes. Known techniques can be used to deposit the layers of materials. For example, after depositing the film containing graphene flakes, a polymer layer could be deposited through spin coating to obtain a continuous layer of uniform thickness. In another embodiment, a solvent can be used to solvate both the graphene flakes and material in the alternative layer, and both the graphene flakes and additional material could be sprayed down in combination.

Fifth Embodiment

Graphene Sheet-Polymer Composites

In another embodiment, graphene flakes can also be combined with other materials, in particular polymers, to form an electrically conducting and optically transparent layer. The components of a composite film, can include (but are not limited to): conducting polymers such as PEDOT or polyaniline; non-conducting polymers such as parylene; or functional (i.e. light sensitive) polymers such as poly((m-phenylenevinyle)-co-2.3.diotyloxy-p-phenylene)), PmPV and polyethylene-imine (PEI).

Sixth Embodiment

Deposition of the Films from Solution

Another embodiment is deposition of the graphene films from solution. Although known methods can be used to deposit many films, new and improved techniques are needed to deposit graphene films. Examples of new techniques designed specifically for deposition of graphene films include:

A. Spray Painting

The solution of dispersed graphene flakes can be spray painted onto a heated or non-heated substrate. The substrate may or may not be frequently rinsed during the spraying process to remove the solubilization agent, or surfactant. The spraying solution may be of any concentration. The substrate surface may be functionalized to aid in graphene adhesion. The network may be sprayed below the percolation density for flakes, at the percolation density for flakes, or above the percolation density for flakes.

B. Drop Casting

A drop of the solution can be placed onto a substrate for a period of time. The substrate may be functionalized to enhance graphene adhesion. The substrate with graphene may be rinsed by appropriate solvents.

C. Spin Coating

The solution can be spin coated along with an appropriate solvent to remove the surfactant simultaneously.

D. Vacuum Filtration

The solution can vacuum filtered through a porous membrane, with the graphene film being deposited on top of the filter. The film can be washed while on the filter with any of numerous liquids to remove surfactant, functionalization agents, or unwanted dirt.

E. Dip Coating

The substrate can be dipped into the solution for a period of time. This may form patterned or random networks of graphene.

F. Printing

The graphene network may be transferred from one substrate to another by means of a stamp. The stamp may be made from PDMS (Polydimethylsiloxane). The transfer can be aided by gentle heating (up to 100 degrees Celsius, and pressure).

Seventh Embodiment

Devices that Incorporate Graphene Networks

Another embodiment of the invention is devices incorporating graphene films. Such devices are fabricated differently from existing devices that utilize other conductive and transparent films, and these devices have new and improved functionality. For example, sensors to detect chemical or biological species can be fabricated where the graphene film forms one of the conducting channels. Solar cells and light emitting diodes currently used indium tin oxide as the transparent electrodes. New organic and inorganic solar cells and light emitting diodes can be fabricated based on graphene films. Due to the mechanical flexibility of the graphene films, such solar cells and light emitting diodes can be flexible rather than rigid. Similarly, touch screens have recurring lifetime issues due to the fact that the indium tin oxide electrodes are brittle.

New touch screens based on graphene films have longer lifetimes. Graphene films can also be incorporated into plasma and liquid crystal displays.

The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention.

The invention claimed is:

1. A method of producing a film, comprising: applying a dispersion comprising graphene flakes and a solvent to a surface of a substrate; and removing the solvent from the dispersion such that the graphene flakes form an interconnected network;
   wherein the graphene flakes are functionalized;
   wherein the interconnected network has an optical transparency of at least 50%, and
   wherein the interconnected network is electrically conductive.

2. The method of claim 1, further comprising applying a polymer to the interconnected network.

3. The method of claim 2, wherein the dispersion further comprises a surfactant.

4. The method of claim 3, wherein the interconnected network has a sheet resistance of less than 50 kOhms/sq.

5. The method of claim 1, wherein the polymer forms a distinct layer adjacent to the graphene flakes.

6. The method of claim 1, wherein polymer forms a composite with the graphene flakes.

7. The method of claim 1, wherein the dispersion further comprises carbon nanotubes.

8. The method of claim 1, wherein the dispersion further comprises a surfactant.

9. A method of producing a film, comprising: applying a dispersion comprising graphene flakes and a solvent to a surface of a substrate; and removing the solvent from the dispersion such that the graphene flakes form an interconnected network, wherein the dispersion further comprises a surfactant;
   wherein the graphene flakes are functionalized;
   wherein the interconnected network has an optical transparency of at least 80%, and
   wherein the interconnected network is electrically conductive.

10. The method of claim 9, wherein the interconnected network has a sheet resistance of less than 2 kOhms/sq.

11. The method of claim 9, further comprising applying a polymer to the interconnected network.

12. A method of producing a film, comprising: applying a dispersion comprising graphene flakes and a solvent to a surface of a substrate; removing the solvent from dispersion such that the graphene flakes form an interconnected network; and applying a polymer to the interconnected network;
   wherein the graphene flakes are functionalized, and wherein the interconnected network has a sheet resistance of less than 50 kOhms/sq and an optical transparency of at least 50%.

13. The method of claim 12, and wherein the dispersion further comprises a surfactant.

14. The method of claim 12, further comprising pre-treating the surface to enhance adhesion of the graphene flakes thereto.

15. The method of claim 12, wherein the dispersion further comprises carbon nanotubes.

* * * * *